Feb. 13, 1923.
A. D. HEDGES
AUTOMOBILE TOP
Filed Feb. 24, 1920
1,445,213
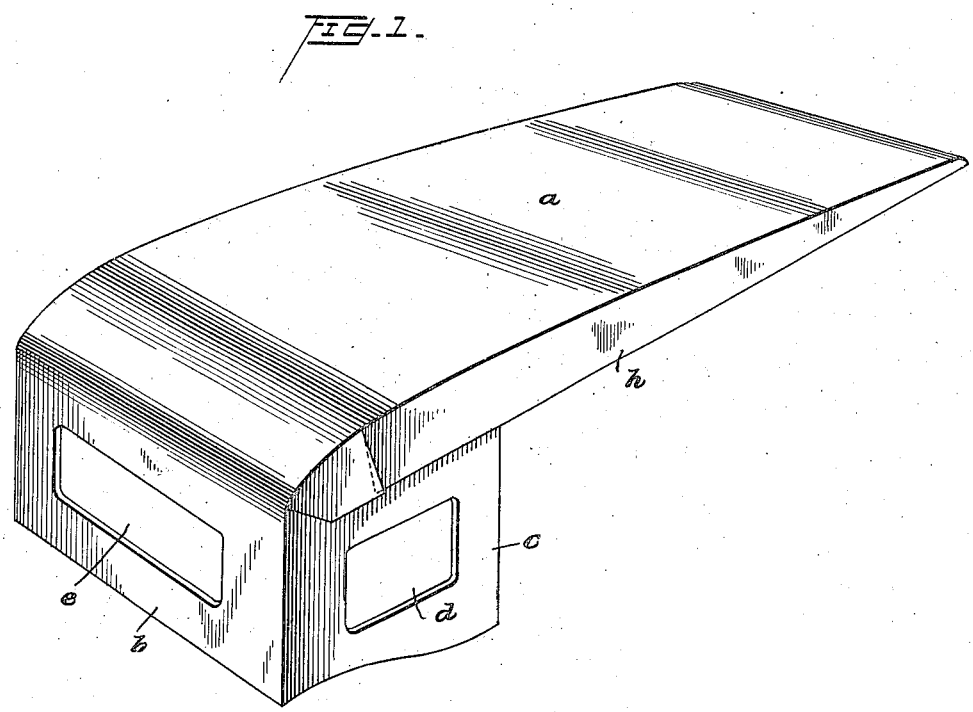
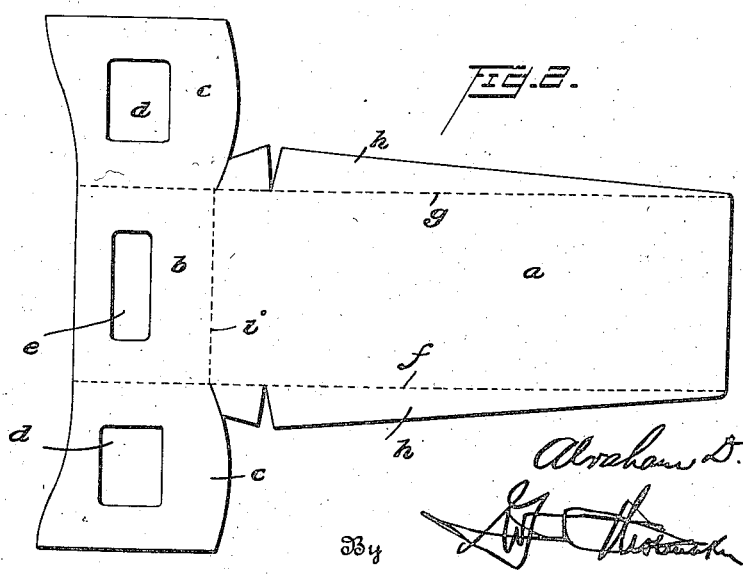

Patented Feb. 13, 1923.

1,445,213

UNITED STATES PATENT OFFICE.

ABRAHAM D. HEDGES, OF LONG BEACH, CALIFORNIA.

AUTOMOBILE TOP.

Application filed February 24, 1920. Serial No. 360,920.

*To all whom it may concern:*

Be it known that I, ABRAHAM D. HEDGES, a citizen of the United States, residing at Long Beach, in the county of Los Angeles and State of California, have invented new and useful Improvements in Automobile Tops, of which the following is a specification.

This invention relates to automobile tops. One object is to provide a metal top for automobiles or other vehicles composed of a single piece of relatively thin sheet metal capable of being manipulated by a pressing or other action into such state as to provide, a single-piece unitary top structure.

A metal top of the nature stated possesses lightness with rigidity and is not subject to tearing, creasing or folding and may be readily applied to an automobile body as a unitary device and as readily removed from the body of the vehicle. The outer surfaces may be painted any suitable color and the inner surfaces may be painted any suitable color or readily lined with any suitable material in any suitable manner.

With the above and other objects in view, the invention consists of the structure more specifically described hereinafter and as more particularly pointed out in the appended claim.

In the drawings:

Figure 1 is a perspective view of the invention.

Figure 2 is a plan view of the blank from which the top is formed.

Referring now more particularly to the accompanying drawings, the reference character 3 indicates a substantially T-shaped blank from which my improved top is formed. The blank includes a main body portion *a* having tapering edges and a rear portion consisting of a main back part *b* and two side portions *c*, each side portion having an opening *d* providing a window opening over which mica or any other suitable transparent material (not shown) may be placed in any suitable manner.

The main back part of the blank is also provided with a window opening *e* for the same purpose as the window openings *d* and these window openings *d* and *e* may be of any suitable shape or design.

To facilitate the conversion of the blank into the top illustrated in Figure 1, it may be creased along the parallel lines *f* and *g* so that the side portions *c* may be readily bent or pressed along the lines of the creases and turned at right angles to the back *b* to assume such positions that their upper edges will lie along the line of the respective creases when the back *b* is arched or bent at a right angle to the top *a*. If desired, a crease may be formed at *i* to facilitate bending, pressing or rolling the back *b* into a right angular relation to the top *a*. The body portion of the blank is substantially oblong and it is provided at its rear end with lateral extensions or wings to form the side portions *c*. Also the eaves or side flanges *h* terminate short of the wings and rear side flanges *h'* are formed at opposite sides of the body portion where the same is bent to provide the top portion *a* and the rear portion *b*. When the blank is formed into the top, the longitudinal side flanges *h* and the rear side flanges *h'* are arranged exteriorly of the side portions *c* which are confined between the same.

The eaves *h* are readily bent, rolled or pressed along the creases *f* and *g* to overhang the edges of the top *a*, as shown, and taper from rear to front.

After the blank has been converted from its blank condition into the top structure, that is, as shown in Fig. 1, the rear side portions *c* may be readily connected to the rear ends of the eaves *h* in any suitable manner, as by welding, rivets or in any common manner. After this or before manipulating the blank the same be ornamented by painting or otherwise on one or both sides.

Instead of bending the blank along the aforesaid crease lines in the manner aforesaid, a sheet metal blank of any suitable shape may be placed over a form and pressed into the shape shown in Fig. 1 without a joint or seam at the point between the side eaves and the upper edges of the sides or at any other point in the structure.

A metal top is here provided which has advantages over a cloth top, one advantage being that there is no danger of fire in the event of a careless person throwing a lighted cigar or cigarette on the top as is frequently done from office and other buildings. The metal too resists and throws off air currents and is not subject to wrinkling under air pressure or for other reasons. The metal used is preferably aluminum but other thin, light sheet metal may be employed, rendering the top comparatively light, yet strong and durable, enabling easy application to or removal from the vehicle, and obviating the frequent renewal of the common cloth tops, and keeping its shape and not becoming unsightly as do the cloth tops incident to wear.

What is claimed is:

As a new article of manufacture, a top for vehicles formed of a thin sheet of metal and including a roof section and a depending rear section, the metal being continuous and unjointed from the lower edge of the rear section to the front edge of the roof section, the roof section having depending longitudinal eaves at its edges forming side walls, the rear section having continuous unjointed forwardly directed side portions at its ends with the upper edges of said side portions of the rear section fitting within the side walls of the top section and at their upper ends connected to said side walls to strengthen said side walls and prevent outward movement of said side portions and whereby to provide a single-piece unitary metallic top structure.

In testimony whereof I have hereunto set my hand.

ABRAHAM D. HEDGES.